United States Patent Office.

SMITH D. ARNOLD, OF PITTSFIELD, MASSACHUSETTS.

Letters Patent No. 93,944, dated August 24, 1869.

IMPROVEMENT IN MANUFACTURE OF BRICKS.

The Schedule referred to in these Letters Patent and making part of the same.

*To all whom it may concern:*

Be it known that I, SMITH D. ARNOLD, of Pittsfield, in the county of Berkshire, and State of Massachusetts, have invented a new and useful Improvement in the Manufacture of Brick; and I do hereby declare that the following is a full, clear, and exact description thereof, which will enable others skilled in the art to make and use the same.

This invention relates to a new method of preparing non-pressed brick for use, with an object of obtaining smooth fronts and tight joints.

It is well known that moulded brick, when burned, expand at different points, and become rough, so that they can neither be used for handsome fronts, nor will they make as tight joints and firm structures as the smooth-faced brick produced by presses.

By my invention the moulded brick will be made as smooth as those produced by the presses.

My invention consists in grinding, by suitable mechanism, the faces of the burned moulded bricks, so as to smooth the same. They will then be of equal value as the pressed brick, and may be used for the same purposes, while they can be produced at a much less cost.

I do not claim anything in the making or forming of the brick, nor in the composition of the same, as my invention is applicable to all moulded bricks.

Having thus described my invention,

I claim as new, and desire to secure by Letters Patent—

Smoothing the faces of moulded bricks by grinding, after the same have been burned, to produce smooth-moulded, in imitation of pressed bricks, as new articles of manufacture, substantially as set forth.

SMITH D. ARNOLD.

Witnesses:
W. H. SWIFT,
J. S. RATHBUN.